United States Patent [19]
Hunter

[11] 3,891,156
[45] June 24, 1975

[54] MECHANISM FOR DETECTING TRAPPED CORDS ON A CREEL

[75] Inventor: Edward E. Hunter, Akron, Ohio

[73] Assignee: The Goodyear Tire & Rubber Company, Akron, Ohio

[22] Filed: Sept. 7, 1973

[21] Appl. No.: 395,330

[52] U.S. Cl............... 242/54 R; 242/49; 242/75.4; 242/129.8; 242/131; 242/156.2
[51] Int. Cl...................... B65h 63/04; B65h 59/04
[58] Field of Search.......... 242/54 R, 49, 36, 129.8, 242/131, 131.1, 156, 156.2, 57, 75.4

[56] References Cited
UNITED STATES PATENTS

| | | | |
|---|---|---|---|
| 878,235 | 2/1908 | Reece | 242/54 R |
| 3,515,359 | 6/1970 | Norton | 242/129.8 |
| 3,778,003 | 12/1973 | Godderidge | 242/156 |

Primary Examiner—Stanley N. Gilreath
Attorney, Agent, or Firm—F. W. Brunner; H. E. Hummer

[57] ABSTRACT

A mechanism for stopping operation of a creel when a cord paying out from one of the spools on the creel becomes trapped. The mountings of the individual spools of cord on the creel, are separately movable for actuating an associated switch controlling operation of the creel. Thus, when the tension in a trapped cord increases to a predetermined level, the mounting of the spool containing the trapped cord moves and actuates an adjacent switch to stop operation of the creel and consequent rotation of the spools.

22 Claims, 4 Drawing Figures

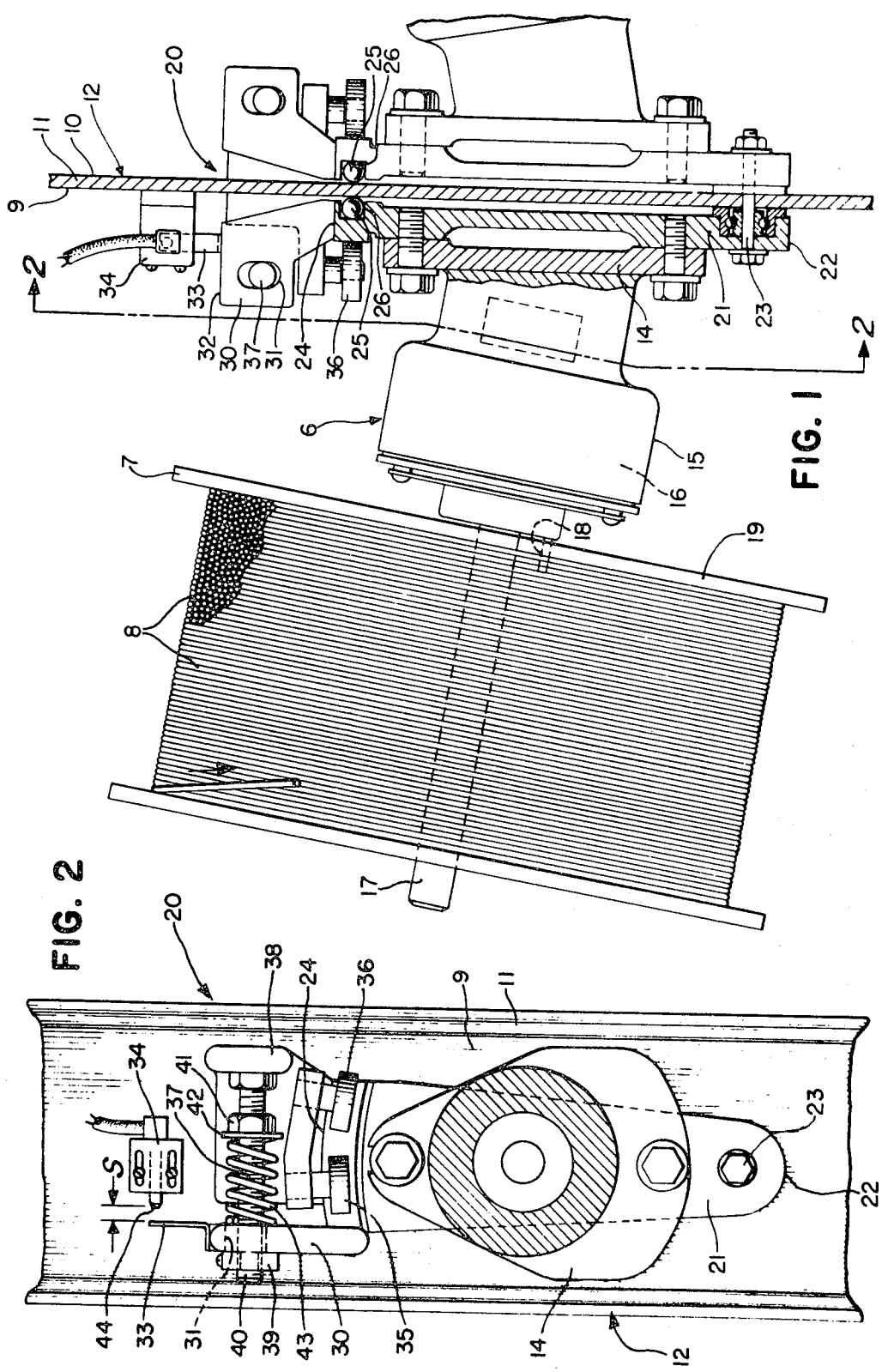

MECHANISM FOR DETECTING TRAPPED CORDS ON A CREEL

BACKGROUND OF INVENTION

The invention is particularly well suited for use in a creel holding spools of wire cord used in the reinforcement of tires. The spools of wire are each mounted on a separate braking device for regulating rotation of the spool and consequent tension in the wire cord as it pays out from the spool. The paying out of the individual wire cords must be continuously monitored to keep a cord from breaking should it become trapped on a spool for any reason, since a broken cord seriously affects operation of the creel which must be shut down immediately to repair the broken cord and rethread it through the creel before operation of the creel can be resumed. This is a burdensome task since there may be as many as 1200 wire cords paying out from the creel.

The continuity of the various wire cords is presently checked by dividing the cords into groups or rows and passing each row over a separate roller coupled to load cells for monitoring the force applied against the roller by the particular wire cords. When the initial force on each roller is radically altered and reaches a predetermined level, the operation of the creel is stopped until the cause of the increased load on the roller is determined. This particular system is not very satisfactory because there may be as many as 100 to 300 wire cords passing over each roller and the breaking strength of an individual cord may be exceeded before the system can react to shut down the creel. Moreover, the individual rollers are very expensive and require constant maintenance. A more desirable system is monitoring the paying out of the individual wire cords from their spools as distinguished from checking a group of cords. The invention is directed to a device for accomplishing this.

SUMMARY OF INVENTION

Briefly stated, the invention is in a mechanism for stopping rotation of a spool of cord when, for any reason, the cord paying out from the spool becomes trapped on the spool. The mechanism comprises a support for the spool and means for mounting the support for movement which causes actuation of an electrical switch for stopping rotation of the spool to keep the trapped cord from breaking. The mechanism also includes means for allowing movement of the support in a switch actuating direction when tension in the cord reaches a predetermined level below the tension necessary for breaking the cord.

DESCRIPTION OF THE DRAWING

The following description of the invention will be better understood by having reference to the annexed drawing, wherein:

FIG. 1 is an end view of a spool of wire mounted on a creel, showing a mechanism made in accordance with the invention for detecting a cord trapped on the spool and stopping operation of the creel;

FIG. 2 is the mechanism viewed from line 2—2 of FIG. 1;

ENVIRONMENT OF THE INVENTION

Figure 3:
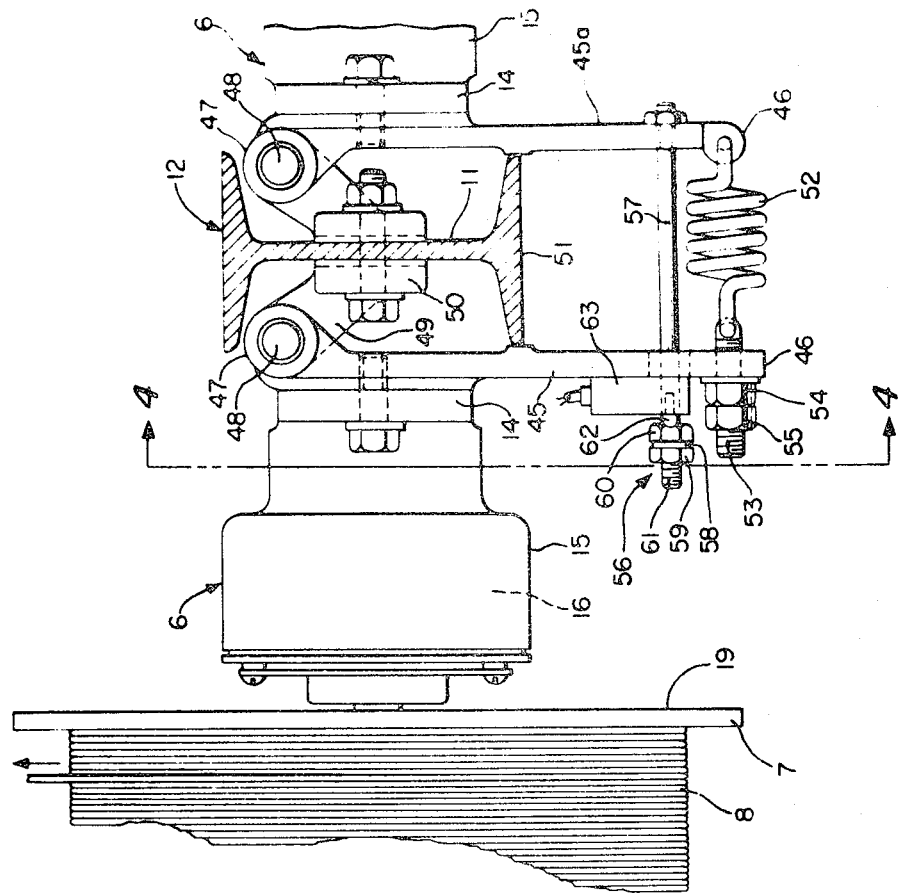
FIG. 3 is a top view of another embodiment of the invention.

Referring generally to the drawing, there is shown a conventional support or mounting 6 for a standard spool 7 of wire cord 8. The mounting 6 is typical of a number of similar mountings which are fastened in pairs to opposing sides 9 and 10 of the webs 11 of a number of vertically disposed standard I-beams which form a creel 12 from which numerous wire cords 8 pay out for passage through, for example, an adjacently disposed machine for calendering the wire cords with rubber to form wire cord ply material used in the production of tires.

Each of the spool mountings 6 essentially comprises a base 14 and an outstanding housing 15 enclosing a suitable braking device 16 for exerting a predetermined torque on the rotating spool 7 to produce a certain desired initial tension in the wire cord 8 as it pays out from the spool 7. Each of the spools 7 is mounted on a spindle 17 extending from the housing 15 and is keyed to the braking device 16 by a pin 18 passing through an adjacent end 19 of the spool 7.

THE INVENTION

A separate mechanism, generally indicated at 20, is associated with each of the spool mountings 6 for detecting when a wire cord 8, paying out from an associated spool 7, becomes trapped on the spool 7 and for subsequently stopping operation of the creel 12 and rotation of the spools 7.

The trapped wire detector mechanisms 20 of FIGS. 1 and 2 are of similar design; therefore, their description will be in relation to the single unit shown which comprises a triangular, pie-shaped pivot arm 21 on which the regular base 14 of the spool mounting 6 is firmly bolted. The narrower end 22 of the pivot arm 21 is rotatably mounted on a pivot pin 23 which extends angularly from an adjacent web 11 of the creel 12. The pivot pin 23 is preferably normal to the web 11 such that the wider end 24 of the pivot arm 21 is free to rotate about the pivot pin 23 in a plane parallel to the web 11. The free rotating end 24 of the pivot arm 21 is supported on a plurality of similar ball bearings 25 which are trapped and rotatable in mating recesses 26 spaced in the pivot arm 21. The ball bearings 25 facilitate rotation or movement of the pivot arm 21 on the web 11 of the creel 12.

The pivot arm 21 includes an outstanding guide plate 30 having a slightly elongated slot 31 disposed adjacent the free end 32 of the guide plate 30. A finger 33 is carried by the pivot arm 21 and extends outwardly from the guide plate 30 for contacting and actuating an adjacent electrical switch 34 which controls operation of the creel 12 and consequent rotation of the spools 7 of wire cord 8.

A pair of rollers 35 and 36 are cantilevered over the pivot arm 21 and rollingly engage the arm adjacent its free rotating end 24 in opposed relation to the ball bearings 25. The rollers 35 and 36 press the pivot arm 21 firmly against the ball bearings 25 and web 11 and keep the pivot arm 21 from tilting as it rotates and moves over the adjacent surface 9 of the web 11.

An elongated guide rod 37 is cantilevered from a bracket 38 which is secured to the web 11 between the switch 34 and adjacent rotating end 24 of the pivot arm 21. The guide rod 37 is conveniently a threaded bolt which is tangentially disposed to an arc swung about the pivot pin 23 and aligned for passage through the slot 31 of the guide plate 30. A threaded cap 39 is mounted on the free end 40 of the guide rod 37 and acts as a stop for the guide plate 30 as the finger 33 moves out of contact with the switch 34. A combination threaded nut 41 and washer 42 are mounted on the guide rod 37 in spaced relation from the cap 39. A coil spring 43 is disposed around the guide rod 37 between the nut 41 and guide plate 30 and acts to bias the finger 33 out of actuating contact with the switch 34. The finger 33 is normally biased out of contact with the switch 34, but the finger 33 could just as easily be normally in contact with a different switch which would stop operation of the creel 12 when contact between the finger 33 and adjacent switch 34 is broken. The position of the nut 41 on the guide rod 37 may be changed to vary the biasing force exerted by the coil spring 43 against the guide plate 30 of the pivot arm 21. However, it is preferable to use a coil spring 43 with the desired spring load characteristics to keep the unit as simple as possible. Thus, the pivot arm 21 and attached spool mounting 6 will not move into actuating contact with the adjacent switch 34 until tension in a cord, trapped on the spool 7, increases to a level where the moment of the cord tension about the pivot pin 23 exceeds the moment of the biasing force of the coil spring 42 about the same pivot pin 23. The electrical switch 34, when actuated by the finger 33, shuts off the flow of electricity to the creel 12 which stops operating until the trapped cord can be freed and the creel 12 reactivated. The actuated switch 34 may also be used to close an electrical circuit including a light adjacent the switch 34, to help an operator of the creel 12 locate the spool on which the cord is trapped.

The rollers 35 and 36, guide rod 37, and bracket 38, are conveniently made into an assembly which can be simply attached to the web 11 of the creel 12. The position of the switch 34, as shown in the drawing, is also variable in a limited direction along an axis which is also tangentially disposed to an arc swung about the pivot pin 23. Thus, the spacing S between the finger 33 and electrical contact 44 of the switch 34 may be slightly varied, if required for any reason.

Figure 4:
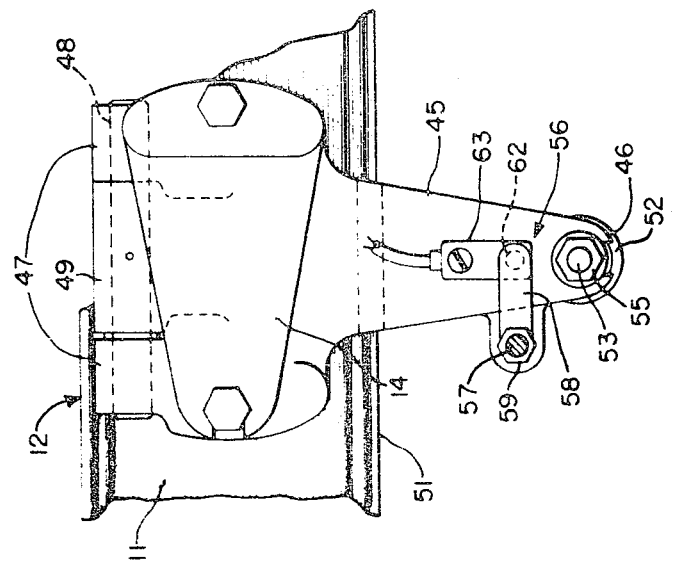
FIG. 4 is the other embodiment viewed from line 4—4 of FIG. 3.

The trapped cord detector mechanisms 20 of FIGS. 3 and 4 are also similar; therefore, their description will be in relation to the single unit shown which comprises a triangular pie-shaped pivot arm 45 having a narrower end 46 and a wider, bifurcated end 47 which is rotatably mounted by a pivot pin 48 to a leg 49 extending angularly from a bracket 50 bolted to the web 11 of the creel 12. The pivot arm 45 is mounted for rotation in a plane normal to the web 11 and about a pivot pin 48 which is parallel to the web 11. A flange 51 along one marginal edge of the web 11 acts as a stop against which the opposing pairs of similar pivot arms, hereafter for convenience indicated as 45 and 45a, rest. As shown, the flange 51 maintains the pivot arms 45 and 45a in parallel relation. The opposing pair of pivot arms 45 and 45a are held in biased relation against the flange 51 by a coil spring 52 acting between the narrower ends 46 of the pivot arms 45 and 45a. One end of the coil spring 52 is secured to the pivot arm 45a, whereas the other end of the spring 52 is fastened to a threaded bolt 53 passing freely through the opposing pivot arm 45. A pair of nuts 54 and 55 are threadably mounted on the bolt 53 and used for axially moving the bolt 53 to vary the biasing force exerted by the spring 52, if such is desired.

A simple switching mechanism is provided for breaking the electrical circuit, including the creel 12, to stop operation of the creel 12 when a cord becomes trapped on a spool. The switching mechanism 56 comprises an elongated threaded rod 57 which is secured to one of the opposing pairs of pivot arms, e.g. pivot arm 45a, and extends freely therefrom beyond the other of the opposing pair of pivot arms, e.g. pivot arm 45. The longitudinal axis of the rod 57 is preferably normal to the opposing pair of parallel pivot arms 45 and 45a. The rod 57 carries an electrical contact 58 in the form of a metal plate which is cantilevered over the adjacent pivot arm 45. The contact plate 58 is firmly held between a pair of nuts 59 and 60 which are threadably mounted on the adjacent free end 61 of the rod 57.

The second electrical contact of the switching mechanism 56 comprises a metal screw head 62 extending from a bar 63 which is bolted on the adjacent pivot arm 45. The two electrical contacts 58 and 63 are in electrical circuitry with the creel 12 and, when placed in electrical communication, act to stop operation of the creel 12 and consequent rotation of the spools 7. It can be appreciated from a study of FIG. 3 that electrical contact will be made if either of the pivot arms 45 or 45a rotate in response to a cord becoming trapped on associated spools 7. Thus, a single spring 52 and switching mechanism 56 are utilized for each pair of pivot arms 45 and 45a. The switching mechanism 56 will be actuated much more quickly should cords become trapped on the spools of the opposing pair of pivot arms 45 and 45a. However, this situation is probably rare and presents no particular problems for successfully operating the system described.

Thus, there has been provided a simple mechanism for individually monitoring the cords paying out from a creel and detecting when a cord becomes trapped on its particular spool. The mechanism replaces the more costly and complex rollers and load cells presently used for monitoring groups of cords which is not as desirable as checking the individual cords for continuity.

What is claimed is:

1. A mechanism for stopping rotation of a spool of cord on a creel when the cord paying out from the spool becomes trapped on the spool, comprising in combination:
   a. a support for the spool, including:
      I. a rotatable pivot arm, and
      II. a spindle carried by the pivot arm and having a longitudinal axis about which the spool rotates, the longitudinal axis of the spindle being angularly disposed to a vertical plane;
   aa. means for mounting the pivot arm for rotation in the direction which cord pays out from the spool, whereby the spool and spindle carried by the pivot arm, are displaceable from a position where the cord normally pays out from the spool;
   b. means for stopping rotation of the spool in response to displacement of the spindle and spool from the position where the cord normally pays out from the spool;
   c. a braking device carried by the support for producing an initial tension in the cord as it pays out from the spool; and
   d. means for exerting a predetermined, constant biasing force against the pivot arm to prevent displacement of the spindle and spool, until tension in the cord paying out from the spool reaches a predetermined level where it overcomes the effect of the constant biasing force against the support, the tension at said level being greater than the initial tension in the cord and lower than the tension required for breaking the cord.

2. The mechanism of claim 1, wherein the means for stopping rotation of the spool includes a switch disposed adjacent the support and actuated thereby in response to displacement of the spindle and support.

3. The mechanism of claim 2, wherein the force exerting means (d) includes a spring with a desired load characteristic for biasing the support out of actuating relation with the switch.

4. The mechanism of claim 3, which includes means for changing the load characteristic of the spring.

5. The mechanism of claim 3, wherein the pivot arm is mounted for rotation in a vertical plane.

6. The mechanism of claim 3, wherein the pivot arm is mounted for rotation in a horizontal plane.

7. The mechanism of claim 3, which includes:
h. a finger carried by the pivot arm for actuating the switch; and the pivot arm mounting means includes:
i. means for mounting the end of the pivot arm farthest from the finger for rotation about a generally horizontal axis.

8. The mechanism of claim 7, which includes:
j. means for maintaining rotation of the pivot arm in a vertical plane and preventing tilting of the pivot arm as it rotates in said plane.

9. The mechanism of claim 8, wherein means (j) includes a pair of spaced rollers rollingly engaging the pivot arm adjacent an end of the arm in farthest spaced relation from the rotational axis of the arm.

10. The mechanism of claim 9, which includes:
k. a guide rod angularly disposed to the finger between the switch and rotational axis of the pivot arm;
m. a guide plate carried by the pivot arm, the guide plate being angularly disposed to the guide rod and having a slot through which the guide rod passes;
n. a pair of stops mounted in spaced relation on the guide rod such that one of said pair of stops is on either side of the guide plate to limit reciprocation of the pivot arm; and
o. a coil spring surrounding the guide rod between the guide plate and one of the pair of stops for biasing the plate against the other pair of stops whereby the finger is held out of actuating relation with the switch.

11. The mechanism of claim 10, which includes means for mounting at least one of the stops for axial movement along the guide rod such that the spring can be compressed to change its load characteristic.

12. A creel having a planar web and a plurality of rotatable spools of cord, comprising in combination:
a. support for each spool of cord, including a spindle having a longitudinal axis which is angularly disposed to a vertical plane and about which the spool rotates;
b. a separate braking device coupled to each support for tensioning the cords paying out from the spools;
c. a separate pivot arm on which each support and associated braking device are secured for unitary movement with the arm;
d. means for individually mounting each pivot arm for rotation in the direction which cord pays out from the spool associated with the pivot arm;
e. means actuated by rotation of a pivot arm for stopping rotation of the spools; and
f. separate means for exerting a predetermined, constant biasing force against each pivot arm for biasing the pivot arms out of actuating relation with the spool stop rotation means (e) until tension in a cord paying out from a spool on a pivot arm reaches a predetermined level where it overcomes the effect of the constant biasing force against the pivot arm, the tension at said level being lower than the tension required for breaking the cord.

13. The creel of claim 12, wherein the pivot arm mounting means (d) includes:
g. means for mounting each pivot arm for rotation in a vertical plane.

14. The creel of claim 13, which includes:
h. a finger carried by each pivot arm for actuating the spool stop rotation means (e) which includes an electrical switch disposed adjacent the finger; and the biasing means (f) includes:
i. a separate spring with a predetermined load characteristic for biasing each finger out of actuating relation with an adjacent switch.

15. The creel of claim 14, wherein the biasing means (f) also includes:
j. a pair of spaced stops associated with each finger for limiting reciprocation of the finger therebetween and in relation to an adjacent switch;
k. a separate coil spring coacting between each finger and one of the pair of associated stops for biasing the finger against the other of the pair of associated stops and out of actuating relation with an adjacent switch; and
l. means for mounting the stops of each pair of stops for relative movement such that a coil spring can be compressed therebetween to change the load characteristic of the spring.

16. The creel of claim 12, wherein the pivot arm mounting means (d) includes:
g. means for mounting each pivot arm for rotation in a horizontal plane.

17. The mechanism of claim 16, wherein the spool stop rotation means (e) includes:
m. a pair of electrical contacts associated with each pivot arm;
n. means for mounting one of the pair of contacts for unitary movement with the pivot arm; and
o. means for mounting the other of the pair of contacts in spaced contacting alignment with the contact moving, in unison, with the pivot arm.

18. The creel of claim 17, wherein the biasing means (f) includes:
p. a separate spring coacting with each of the pivot arms for biasing the contacts of each pair of contacts apart, the spring having a predetermined load characteristic.

19. The mechanism of claim 16, wherein the pivot arms are mounted on the creel in pairs on opposite sides of the web, and the means (e) includes:
m. a pair of electrical contacts associated with each pair of opposing pivot arms mounted on opposite sides of the web;

n. means for mounting one of the pair of contacts on one of the pair of pivot arms for unitary movement with said one pivot arm; and o. means for mounting the other of the pair of contacts on the other of the pair of pivot arms for unitary movement with said other pivot arm, the contacts being in spaced alignment and engaging each other when either of the pair of pivot arms moves in response to a cord becoming trapped on a spool carried by the moving pivot arm.

20. The creel of claim 19, wherein the means (f) includes a separate coil spring fastened between each pair of opposing pivot arms mounted on opposite sides of the web, for biasing the pair of contacts, associated with said pair of arms, apart and out of engagement.

21. The creel of claim 20, which includes means for maintaining the pivot arms of each pair of pivot arms parallel when the spools are in their normal positions where cord pays out from them.

22. The creel of claim 21, which includes means coacting between at least one of the pairs of opposing pivot arms and the springs therebetween for changing the load characteristics of the springs.

* * * * *